US007191937B2

(12) United States Patent

Minamishin et al.

(10) Patent No.: US 7,191,937 B2

(45) Date of Patent: Mar. 20, 2007

(54) CASH DEPOSITORY

(75) Inventors: Hayato Minamishin, Tokyo (JP); Atsunori Kimura, Tokyo (JP); Akinori Kojima, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 21 days.

(21) Appl. No.: 11/046,778

(22) Filed: Feb. 1, 2005

(65) Prior Publication Data

US 2005/0127163 A1 Jun. 16, 2005

Related U.S. Application Data

(63) Continuation of application No. PCT/JP02/08818, filed on Aug. 30, 2002.

(51) Int. Cl.
*G06Q 40/00* (2006.01)
*G07D 11/00* (2006.01)

(52) U.S. Cl. .................................... 235/379; 235/449

(58) Field of Classification Search ................ 235/379, 235/380, 382, 382.5, 376, 480, 381, 449; 194/217; 902/11, 12

See application file for complete search history.

(56) References Cited

U.S. PATENT DOCUMENTS

| | | | | |
|---|---|---|---|---|
| 4,571,489 | A * | 2/1986 | Watanabe | 235/379 |
| 4,594,502 | A * | 6/1986 | Watanabe | 235/379 |
| 4,596,924 | A * | 6/1986 | Watanabe | 235/379 |
| 4,639,582 | A * | 1/1987 | Arikawa et al. | 235/379 |
| 4,772,781 | A * | 9/1988 | Watanabe | 235/379 |
| 4,931,963 | A * | 6/1990 | Kimura et al. | 702/184 |
| 2003/0080488 | A1* | 5/2003 | Abe et al. | 271/3.14 |
| 2004/0124062 | A1* | 7/2004 | Molbak | 194/217 |
| 2005/0023106 | A1* | 2/2005 | Abe et al. | 194/207 |
| 2005/0127163 | A1* | 6/2005 | Minamishin et al. | 235/379 |

FOREIGN PATENT DOCUMENTS

| | | |
|---|---|---|
| JP | 56-16287 | 2/1981 |
| JP | 2-83847 | 6/1990 |
| JP | 4-264997 | 9/1992 |
| JP | 7-160930 | 6/1995 |
| JP | 2002-216203 | 8/2002 |

OTHER PUBLICATIONS

Chinese Office Action for Application No. 028293932 dated Nov. 18, 2005.

Korean Office Action for Application No. 10-2005-7000002; mailed Jun. 26, 2006.

* cited by examiner

*Primary Examiner*—Thien M. Le

(74) *Attorney, Agent, or Firm*—Staas & Halsey LLP

(57) ABSTRACT

A sensor for executing simple discrimination is provided on a transfer path immediately after a cash inlet of a cash depository. The sensor detects a position of a bill in a transfer direction, a width of the bill in a direction orthogonal to the transfer direction, thereby outputting detection results to a controller. The controller calculates a degree of a slant of the bill and the width of the bill, thereby determining whether or not those values are in excess of reference values. If the controller determines that the degree of the slant and the width of the bill are in excess of the reference values, the transfer direction of the transfer path is changed over to coincide with a direction opposite to a normal direction by reverse-rotating a motor.

8 Claims, 4 Drawing Sheets

CASH DEPOSITORY

CROSS REFERENCE TO THE RELATED APPLICATION

This application is a continuation of international PCT application No. PCT/JP02/08818 filed on Aug. 30, 2002.

BACKGROUND OF THE INVENTION

1. Field of the Invention

The invention relates to a cash depository for use at financial institutions, and so forth.

2. Description of the Related Art

A cash depository, and an ATM are in use for depositing cash in a bank or the like, and withdrawing cash therefrom.

FIG. 4 is a schematic representation showing the interior structure of a conventional cash depository. A shutter is provided in the upper part of a cash inlet 12, and is retracted upon pressing of a deposit button to enable bills to be deposited.

A cash-pooling unit 13 is for temporarily pooling the bills that have been thrown in through the cash inlet 12, and internally transferred.

A discrimination unit 14 determines whether or not the bills delivered via transfer paths a1, b1 are genuine. Bills identified as genuine bills are transferred to either a 10,000 yen bill stacker 15 for storing 10,000 yen bills or a 1,000 yen bill stacker 16 for storing 1,000 yen bills.

Attendant cassettes 17, 18 are cassettes detachable from the outside, and are for storing bills for replenishment.

A left-behind box 19 is provided for keeping cash left behind by a customer in storage, and if bills withdrawn are not taken out from the cash inlet 12 after a predetermined time length, a controller (not shown) causes the bills remaining in the cash inlet 12 to be transferred to the left-behind box 19 to be stored therein.

A reject box 20 is provided for storing bills which have been identified as genuine bills by the discrimination unit 14, but are found considerably stained or damaged.

Further, it frequently happens that bills thrown in the cash inlet 12 by customers are in disarray, or include kinds of bills which the cash depository is incapable of processing. As a result, there can be times when the cash depository is jammed with the bills at some midpoint on the transfer paths. Once jamming occurs in the middle of the transfer paths in the cash depository, a problem has resulted in that it has taken time to fix a trouble.

SUMMARY OF THE INVENTION

It is therefore an object of the invention to check jamming of a cash depository with bills in the middle of transfer paths.

A cash depository according to the invention comprises a cash inlet where a customer throws bills in, a transfer mechanism for internally transferring the bills thrown in the cash inlet, a simple discrimination unit for determining whether or not a degree of a slant of each of the bills transferred by the transfer mechanism, or a width thereof, in a direction orthogonal to a transfer direction, is in excess of reference value, a controller for controlling such that the transfer direction of the transfer mechanism is changed over to a direction opposite to a normal direction upon the simple discrimination unit determining that the degree of the slant of each of the bills or the width thereof is in excess of the reference value, and a discrimination unit for determining whether or not the bills are genuine.

With the invention, by performing simple discrimination of respective slants of bills, respective widths of bills, or so forth, bills with degrees of the respective slants thereof, or the respective widths thereof, exceeding the reference values, are sent back to the cash inlet, thereby enabling frequency of jamming occurring to the transfer path in a back-end stage of the cash depository to be reduced. Further, because the simple discrimination of the respective slants of the bills the respective widths of the bills and so forth is performed in the transfer path immediately after the cash inlet, independently from the discrimination unit where determination on whether or not the bills are genuine is executed, it is possible to reduce a possibility of occurrence of jamming in the transfer path where the discrimination unit is installed.

Further, the cash depository according to the invention may comprise a cash inlet where a customer throws bills in, a first transfer mechanism for internally transferring the bills thrown in the cash inlet, a second transfer mechanism provided in a back-end stage of the first transfer mechanism, a simple discrimination unit provided in the first transfer mechanism, for determining whether or not a degree of a slant of each of the bills transferred, or a width thereof, in a direction orthogonal to a transfer direction, is in excess of reference value, a discrimination unit provided in the second transfer mechanism, for determining whether or not the bills are genuine, and a controller for controlling such that the transfer direction of the first transfer mechanism is changed over to a direction opposite to a normal direction upon the simple discrimination unit determining that the degree of the slant of each of the bills or the width thereof is in excess of the reference value.

With the invention, by performing the simple discrimination of the respective slants of the bills, the respective widths of the bills, or so forth, bills with degrees of the respective slants thereof, or the respective widths thereof, exceeding the reference values, are sent back to the cash inlet, thereby enabling frequency of jamming occurring to the transfer path in the back-end stage of the cash depository to be reduced. Further, because the simple discrimination of the respective slants of the bills, the respective widths of the bills, or so forth is performed in the transfer path immediately after the cash inlet, independently from the discrimination unit where determination on whether or not the bills are genuine is executed, it is possible to reduce a possibility of occurrence of jamming in the transfer path where the discrimination unit is installed.

Still further, the cash depository according to the invention may comprise a cash inlet where a customer throws bills in, a first transfer mechanism for internally transferring the bills thrown in the cash inlet, a second transfer mechanism provided in a back-end stage of the first transfer mechanism, a simple discrimination unit provided in the first transfer mechanism, for determining whether or not a degree of a slant of each of the bills transferred, or a width thereof, in a direction orthogonal to a transfer direction, is in excess of reference value, a discrimination unit provided in the second transfer mechanism, for determining whether or not the bills are genuine, a motor for driving the first and second transfer mechanisms, a first rotational force transmission unit having unidirectional rotational force transmission characteristics, for transmitting a rotational force of the motor to the second transfer mechanism, a second rotational force transmission unit having unidirectional rotational force transmission characteristics, in a direction opposite to that for the first rotational force transmission unit, for transmitting the rotational force of the motor to the second transfer mechanism, and a controller for controlling such that a transfer direction of the first transfer mechanism is changed over to a direction opposite to a normal direction by reverse-rotating the motor upon the simple discrimination unit determining that the degree of the slant of each of the bills, or the width thereof is in excess of the reference value.

With the invention, by performing the simple discrimination of the respective slants of the bills, the respective widths of the bills, or so forth, bills with degrees of the respective slants thereof, or the respective widths thereof, exceeding the reference value, are sent back to the cash inlet, thereby enabling frequency of jamming occurring to the transfer path in the back-end stage of the cash depository to be reduced. In addition, with the use of the rotational force transmission units having respective unidirectional rotational force transmission characteristics, opposite to each other, when the motor is reverse-rotated in order to changed over the transfer direction of the first transfer mechanism, the transfer direction of the second transfer mechanism can be caused to coincide with the normal direction. Accordingly, the first and second transfer mechanisms can share the use of the motor for driving both the transfer mechanisms.

DESCRIPTION OF THE PREFERRED EMBODIMENTS

Figure 1:
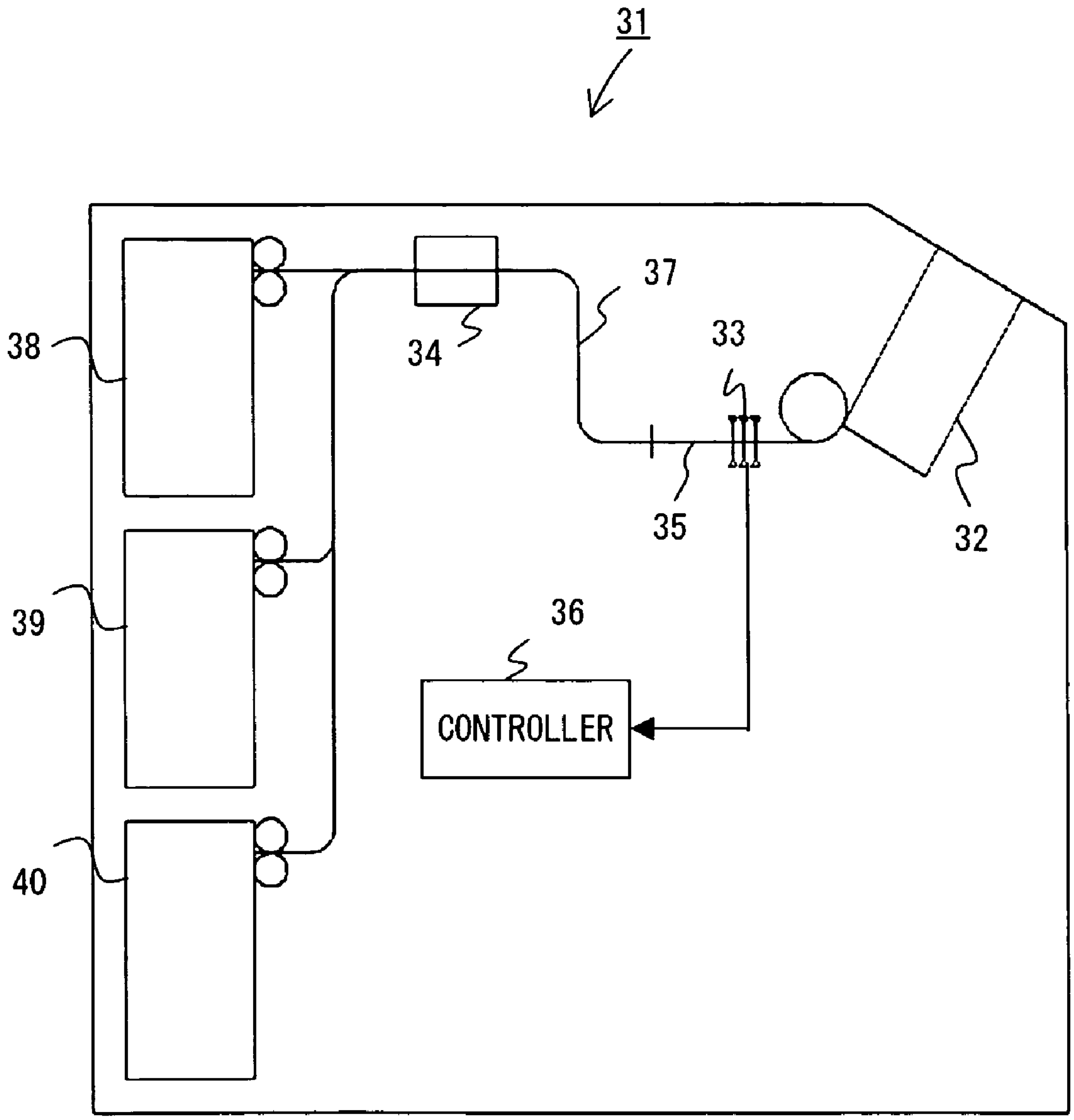
FIG. 1 is a schematic representation of an embodiment of transfer paths of a cash depository according to the invention.

An embodiment of the invention is described hereinafter with reference to the accompanying drawings. FIG. 1 is a schematic representation of transfer paths of the embodiment of a cash depository 31 according to the invention. The cash depository includes an ATM (Automatic Teller Machine).

Figure 4:
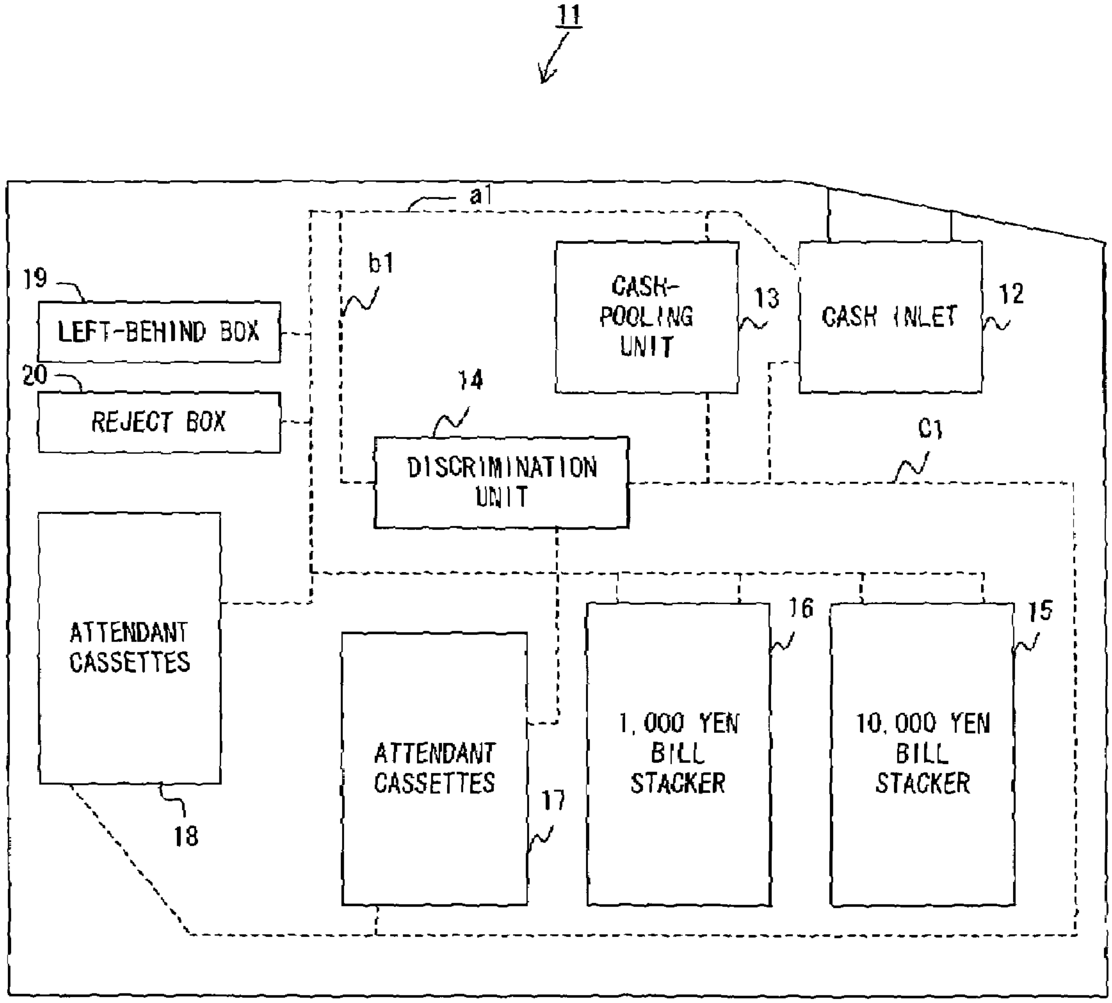
FIG. 4 is a block diagram showing the internal structure of a conventional cash depository.

The cash depository 31 is the same in basic constitution as a conventional cash depository shown in FIG. 4. The former differs from the latter only in that a sensor 33 for executing simple discrimination is provided on a transfer path 35 immediately after a cash inlet 32, and a transfer direction of the transfer path 35 immediately after the cash inlet 32 can be changed over to a direction opposite to a normal direction.

Bills thrown in the cash inlet 32 are drawn out one by one to be thereby transferred toward the leftward direction in FIG. 1, on the transfer path 35. The sensor 33 for executing the simple discrimination is provided partway on the transfer path 35.

The sensor 33 is made up of an optical sensor and so forth, and detects the position of a bill, in the transfer direction, the width of the bill, in a direction orthogonal to the transfer direction, thereby outputting detection results to a controller 36. The controller 36 calculates the degree of a slant of the bill, and the width of the bill on the basis of the position and width of the bill as detected, thereby determining whether or not those values are in excess of reference values. The sensor 33 and controller 36 makeup a simple discrimination unit.

If the controller 36 determines that the degree of the slant of the bill and the width of the bill are in excess of the reference values, the transfer direction of the transfer path 35 is changed over to coincide with a direction opposite to the normal direction, thereby sending the bill back to the cash inlet 32, whereupon the customer rearranges the bill so as to be in order, or remove the bill if a notice is given that it is not subject to processing. By so doing, jamming otherwise occurring in the middle of the transfer paths can be preemptively prevented.

A discrimination unit 34 is provided partway on a transfer path 37. The discrimination unit 34 performs determination on whether or not bills are genuine, and so forth.

Bills identified as genuine bills by the discrimination unit 34 are transferred to a relevant stacker among a stacker 38 for storing 1,000 yen bills, a stacker 39 for storing 5,000 yen bills, and a stacker 40 for storing 10,000 yen bills to be stored therein.

With the present embodiment, the simple discrimination unit provided on the transfer path 35 immediately after the cash inlet 32 identifies bills slanted to a large degree or bills with width larger than a reference width, thereby sending back bills fitting into such categories as described to the cash inlet 32, so that jamming can be prevented from occurring to the discrimination unit 34 provided on the transfer path 37 in a back-end stage.

FIGS. 2A and 2B are block diagrams showing the structure of a transfer mechanism 51 incorporating the transfer paths 35, 37.

A pulley 54 is fixedly attached to a shaft 53 of a motor 52 with screws, and is operatively linked with a pulley 56 by a belt 55.

The pulley 56 is fixedly attached to a shaft 57 with screws, and so forth, and the shaft 57 is rotatively supported by a frame 58. A shaft 64 with transfer rollers 65*a* to 65*c* fixed thereto, a shaft 74 with transfer rollers 75*a* to 75*c* fixed thereto, described in detail later on, and so forth are attached to the frame 58.

Pulleys 59, 60, 61 are fixedly attached to the shaft 57 with screws, and so forth. The pulley 61 is operatively linked with a pulley 63 by a belt 62, and the pulley 63 is fixedly attached to the right-hand end (as seen facing FIG. 2A) of the shaft 64 with screws, and so forth.

The three transfer rollers 65*a* to 65*c* are fixedly attached to the shaft 64. The three transfer rollers 65*a* to 65*c* are transfer rollers for the transfer path 35 in FIG. 1. A groove which a transfer belt, as described later on, is to be put on is provided in the center of the transfer rollers 65*a* to 65*c*, respectively.

Figure 2:
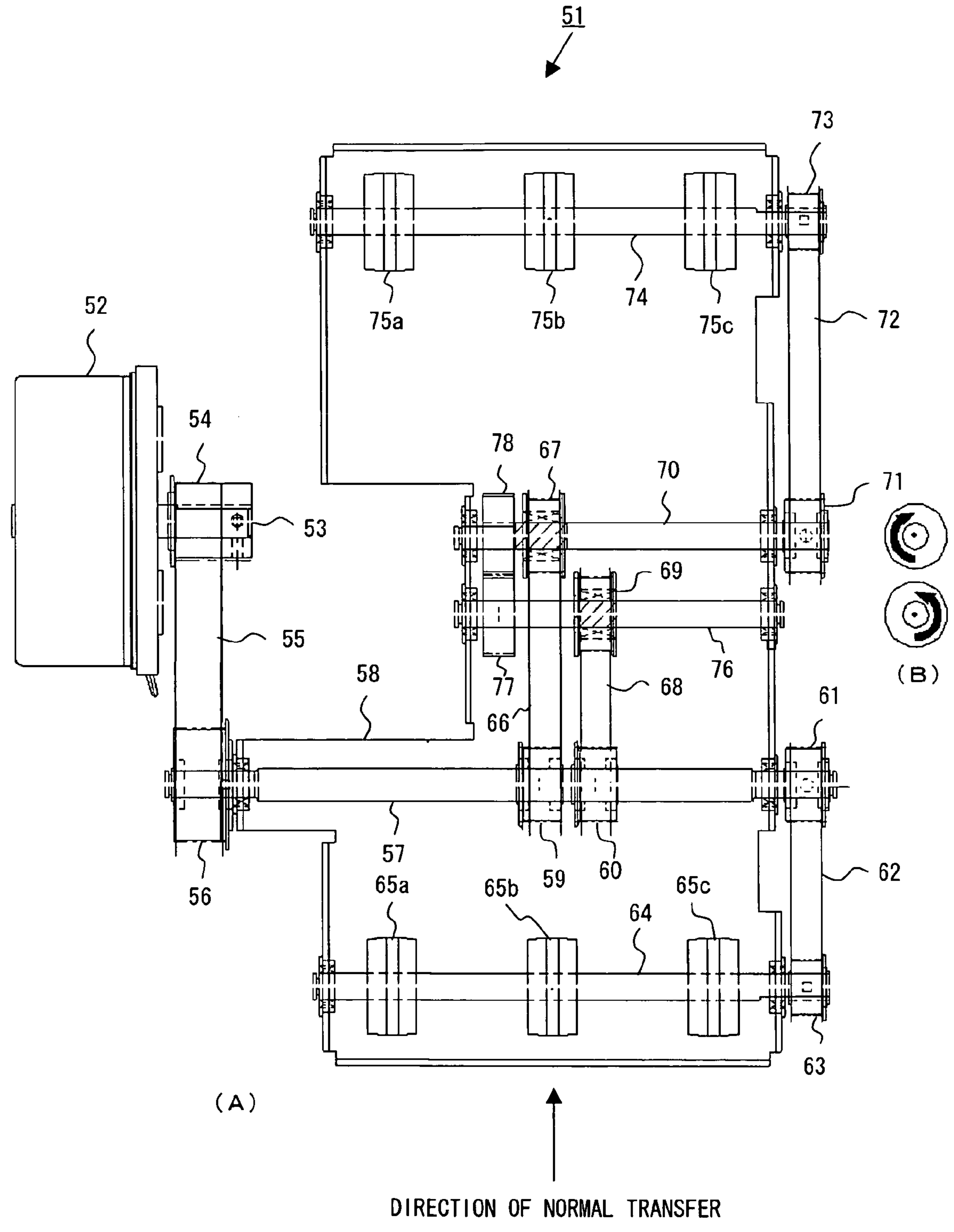
FIGS. 2A and 2B are block diagrams showing a transfer mechanism according to the embodiment of the invention.

Now, when the motor 52 is forward rotated (clockwise rotation as seen from the right-hand direction in FIG. 2 is defined as forward rotation), the pulleys 56, 61, 63 are also rotated clockwise as seen from the right-hand direction in FIG. 2 (hereinafter this direction is referred to merely as a clockwise direction), and the transfer rollers 65*a* to 65*c* as well are rotated clockwise. In this case, the bills are transferred from the lower direction in FIG. 2A to the upper direction, that is, in the direction of normal transfer.

On the other hand, when the motor 52 is reverse rotated (counterclockwise rotation as seen from the right-hand direction in FIG. 2 is defined as reverse rotation), the pulleys 56, 61, 63 are also rotated counterclockwise as seen from the right direction in FIG. 2 (hereinafter this direction is referred to merely as a counterclockwise direction), and the transfer rollers 65*a* to 65*c* as well are rotated counterclockwise. In this case, the bills are transferred from the upper direction in FIG. 2A to the lower direction, that is, in a direction reverse to the direction of the normal transfer to be thereby sent back to the cash inlet 32.

More specifically, if the controller 36 determines that the degree of the slant of the bill, and the width of the bill are in excess of the reference values, the motor 52 is reverse rotated, thereby sending the bills back to the cash inlet 32, so that it is possible to prevent the jamming from occurring on the transfer paths by inducing the customer to throw the bills back in the cash inlet again.

The pulley 59 is operatively linked with a one-way pulley 67 by a belt 66. Further, the pulley 60 is operatively linked with a one-way pulley 69 by a belt 68.

In this connection, the one-way pulleys 67, 69 are pulleys each having unidirectional rotational force transmission characteristics such that these pulleys are in a locked state against rotation in one direction, thereby transmitting rotational force to a shaft, and are in a free state against rotation in the direction opposite to the one direction, thereby failing to transmit the rotational force to the shaft. The one-way pulleys 67, 69 correspond to first and second rotational force transmission units, respectively.

The one-way pulley 67 on one side is attached to a shaft 70, and a pulley 71 is fixedly attached to the right-hand end of the shaft 70 with screws, and so forth. The pulley 71 is operatively linked with a pulley 73 by a belt 72. The pulley 73 is fixedly attached to the shaft 74 with screws, and so forth, and the transfer rollers 75*a* to 75*c*, for transferring the bills, are fixedly attached to the shaft 74. The three transfer rollers 75*a* to 75*c* are transfer rollers for the transfer path 37 in FIG. 1.

The one-way pulley 69 on the other side is attached to a shaft 76, and a gear 77 is fixedly attached to the shaft 76. The gear 77 is engaged with a gear 78 fixedly attached to the shaft 70, thereby transmitting rotation of the gear 77 to the gear 78.

The one-way pulleys 67, 69 each have respective rotation transmission characteristics, mutually opposed to each other, so that, for example, against rotation in a direction causing the one-way pulley 67 to be in the locked state, the one-way pulley 69 is in the free state, thereby failing to transmit the rotational force applied to the one-way pulley 69 to the shaft 76. To the contrary, against rotation in a direction causing the one-way pulley 69 to be in the locked state, the one-way pulley 67 is in the free state, thereby failing to transmit the rotational force applied to the one-way pulley 67 to the shaft 70.

Now, when the motor 52 is forward rotated (clockwise rotation as seen from the right-hand direction in FIG. 2), the pulleys 59, 60 also are rotated clockwise. Because the one-way pulley 67 is locked against clockwise rotation, and is in the free state against counterclockwise rotation, the clockwise rotation is transmitted to the shaft 70, and the pulley 71 fixedly attached to the shaft 70 also is rotated clockwise. Such rotation is transmitted to the pulley 73 via the belt 72, and the transfer rollers 75*a* to 75*c* are rotated clockwise. As a result, the bills are transferred from the lower direction in FIG. 2A to the upper direction.

When the motor 52 is reverse-rotated (counterclockwise rotation as seen from the right-hand direction in FIG. 2), the pulleys 59, 60 also are rotated counterclockwise. Since the one-way pulley 69 has rotation transmission characteristics such that the sane is locked against the counterclockwise rotation, and is in the free state against the clockwise rotation, the counterclockwise rotation is transmitted to the shaft 76, and the gear 77 fixedly attached to the shaft 76 is rotated counterclockwise. Such rotation of the gear 77 is transmitted to the gear 78.

FIG. 2B schematically shows the rotational directions of the gears 77, 78, respectively. As indicated by arrows in the figure, when the gear 77 is rotated counterclockwise, the gear 78 is rotated clockwise.

Upon the clockwise rotation of the gear 78, the pulley 71 is rotated clockwise as with the case of the motor 52 being forward rotated, and the rotation is transmitted to the pulley 73 via the belt 72, whereupon the transfer rollers 75*a* to 75*c* are rotated clockwise. As a result, the bills are transferred from the lower direction in FIG. 2A to the upper direction.

That is, either in the case of the motor 52 being forward rotated, or in the case of the motor 52 being reverse-rotated, the transfer rollers 75*a* to 75*c* are always rotated clockwise, so that the bills can be transferred from the lower direction in FIG. 2A to the upper direction.

Figure 3A:
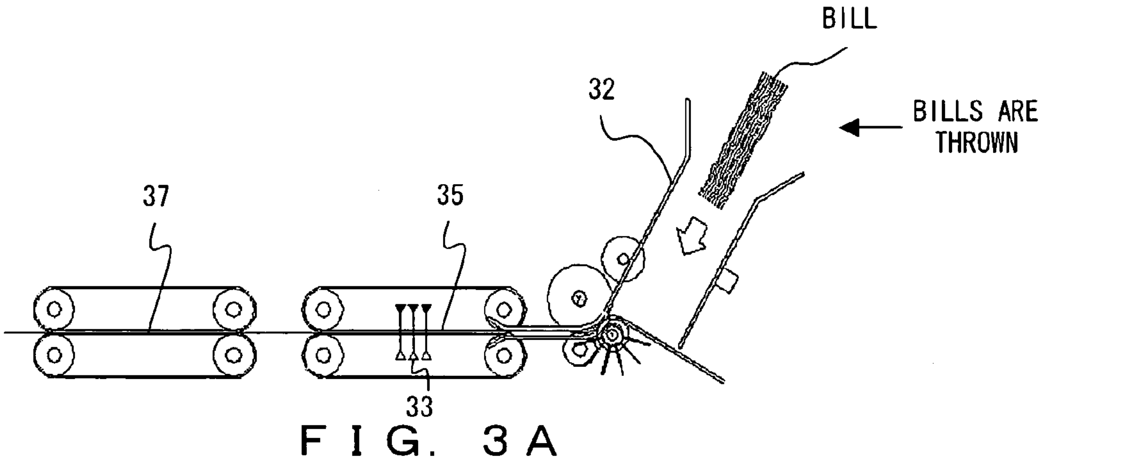
FIGS. 3A to 3C are schematic representations of the transfer paths.
Figure 3B:
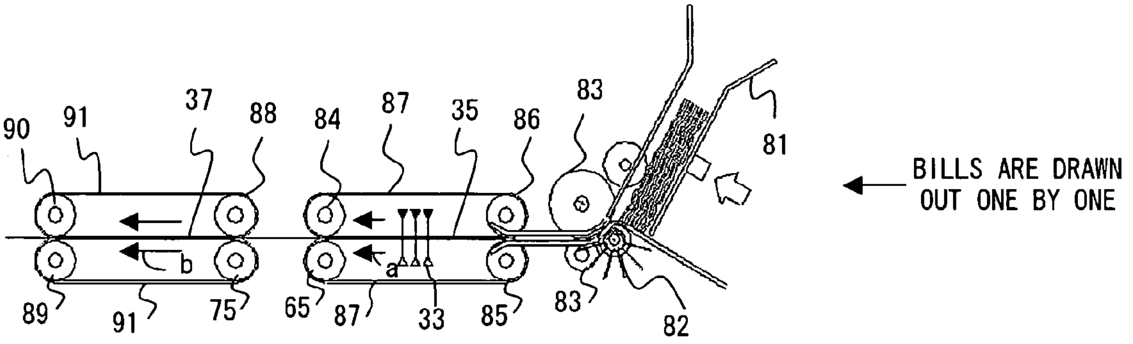
Figure 3C:
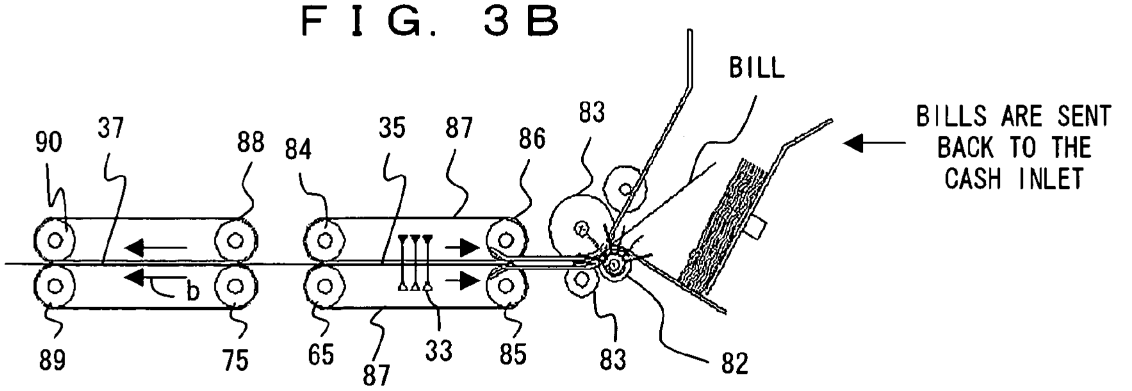

FIGS. 3A to 3C are schematic representations of the transfer paths, in which FIG. 3A shows a state where bills are thrown in the cash inlet 32, FIG. 3B shows a state where the bills are drawn out one by one, and FIG. 3C shows a state where the bills are sent back to the cash inlet 32.

As shown in FIG. 3B, the three transfer rollers 65*a* to 65*c* (these combined are hereinafter referred to as a transfer roller 65) and a transfer roller 84 are disposed in such a way as to oppose each other on the underside, and the upside of the transfer path 35, respectively. Further, transfer rollers 85, 86 are disposed in such a way as to oppose each other on the underside, and the upside of the transfer path 35, respectively.

The transfer roller 65 and the transfer rollers 85, both on the underside, as well as the transfer roller 84 and transfer roller 86, both on the upside, are operatively linked with each other by a transfer belt 87, respectively, and the bills are transferred in a state where the bills are sandwiched between the transfer belts 87.

The transfer rollers 75*a* to 75*c* (these combined are hereinafter referred to as a transfer roller 75) and a transfer roller 88 are disposed in such a way as to oppose each other on the underside, and the upside of the transfer path 37, respectively, and transfer rollers 89, 90 are disposed in such a way as to oppose each other on the under side, and the upside of the transfer path 37, respectively.

The transfer roller 75 and the transfer rollers 89, both on the underside, as well as the transfer roller 89 and transfer roller 90, both on the upside, are operatively linked with each other by a transfer belt 91, respectively, and the bills are transferred in a state where the bills are sandwiched between the transfer belts 91.

In the case where the bills on the transfer path 35 are identified as the genuine bills by the sensor 33 and the controller 36, the motor 52 is forward rotated as described in the foregoing, and the transfer roller 65 is rotated counterclockwise, so that the bills are transferred toward a direction indicated by the arrow a in FIG. 3B (the leftward direction as seen facing FIG. 3), on the transfer path 35.

It is to be pointed out that FIG. 3 shows a section of the transfer paths as seen from the left-hand side (from the motor 52 side) in FIG. 2A, so that the rotation directions of the transfer rollers 65, 75, respectively, are opposite to those described with reference to FIG. 2. In other words, a clockwise direction in FIG. 2 corresponds to a counterclockwise direction in FIG. 3. Description is given hereinafter on the basis of the directions in FIG. 3.

At this point in time, the transfer roller 75 on the transfer path 37 is rotated counterclockwise, so that the bills sent out from the transfer path 35 are transferred toward a direction indicated by the arrow b in FIG. 3B (the leftward direction in FIG. 3B), on the transfer path 37.

On the other hand, in the case where the sensor 33 and the controller 36 determine that respective widths of the bills and degrees of respective slants thereof are in excess of the reference values, the motor 52 is reverse-rotated, and the transfer roller 65 is rotated clockwise, so that the transfer direction of the transfer path 35 is be changed over to the direction opposite to the normal direction. As a result, the bills that are sandwiched between the transfer belts 87 are transferred to the right-hand direction in FIG. 3C.

At this point in time, a draw-out roller 83 is also rotated in the direction opposite to the normal, and further, a draw-out unit 82 as well is rotated in the direction opposite to the normal, thereby sending the bills back to the cash inlet 32. At the same time, a notice is given to the customer that the bills as thrown in are found n.g., whereupon the customer rearranges the bills so as to be in order, or removes unsuitable bills, thereby enabling jamming to be prevented from occurring to the transfer paths inside the cash depository.

Even in the case of the motor 52 being reverse-rotated, the transfer rollers 75 on the transfer path 37 is rotated similarly in the counterclockwise direction as described in the foregoing, so that the bills present on the transfer path 37 are transferred in the same direction as the normal, that is, in a direction indicated by the arrow b in FIG. 3C.

With the present embodiment of the invention, the simple discrimination unit, made up of the sensor 33 and the controller 36, determines whether or not the degrees of respective slants of the bills on the transfer path 35, and the respective widths (lengths in the direction orthogonal to the transfer direction) of the bills are in excess of the reference values, and if those values are in excess of the reference values, the transfer direction of the transfer path 35 is changed over to the direction opposite to the normal direction, thereby sending the bills back to the cash inlet 32, whereupon the customer is requested to throw the bills back in again or to remove unsuitable bills. In this way, it is possible to reduce frequency of jamming occurring to the transfer paths inside the cash depository. Furthermore, with the use of the one-way pulleys, the transfer mechanism for the transfer path 35 as well as the transfer path 37 can be driven by one unit of the motor.

The invention is not limited to the embodiment described herein before, and may be structured as follows.

(1) With the embodiment described, there has been described a case of the transfer rollers 65*a* to 65*c*, and the transfer rollers 75*a* to 75*c* being driven by one unit of the motor, however, the transfer rollers 65*a* to 65*c*, and the transfer rollers 75*a* to 75*c* may be driven by individual motors, respectively. In this case, the transfer direction of the transfer path 35, and that of the transfer path 37 in the back-end stage can be independently controlled, so that the need for using the one-way pulleys can be eliminated.

(2) A mechanism for rotating the transfer rollers 75*a* to 75*c* on the transfer path 37 in the same direction either in the case of the motor 52 being forward rotated, or in the case of the motor 52 being reverse-rotated is not limited to one using the one-way pulleys. Instead, a drive mechanism may be switched over by a solenoid, and so forth.

(3) A bill draw-out mechanism and bill transfer mechanism are not limited to those described with reference to the present embodiment, and other publicly known mechanisms may be used instead.

With the invention, by performing the simple discrimination of the respective slants of bills, the respective widths of bills, and so forth, the bills with degrees of the respective slants thereof, or the respective widths thereof, exceeding the reference values, are sent back to the cash inlet, thereby enabling frequency of jamming occurring to the transfer paths inside the cash depository to be reduced.

What is claimed is:

1. A cash depository comprising:

a cash inlet where a customer throws bills in;

a transfer mechanism for internally transferring the bills thrown in the cash inlet;

a discrimination unit determining whether the bills are genuine;

a simple discrimination unit for determining whether or not a degree of a slant of each of the bills transferred by the transfer mechanism, or a width of each of the bills, in a direction orthogonal to a transfer direction, is in excess of a reference value before the discrimination unit starts to determine the bill; and a controller for controlling such that the transfer direction of the transfer mechanism is changed over to a direction opposite to a normal direction upon the simple discrimination unit determining that the degree of the slant of the bill, or the width of the bill is in excess of the reference value.

2. The cash depository according to claim 1, further comprising a draw-out unit for drawing out the bills thrown in the cash inlet to the transfer mechanism, and sending back the bills transferred on a transfer path of the transfer mechanism, in a direction opposite to a normal direction to the cash inlet.

3. A cash depository comprising:

a cash inlet where a customer throws bills in;

a first transfer mechanism for internally transferring the bills thrown in the cash inlet;

a second transfer mechanism provided in a back-end stage of the first transfer mechanism;

a discrimination unit, provided in the second transfer mechanism, determining whether the bills are genuine;

a simple discrimination units provided in the first transfer mechanism, determining whether or not a degree of a slant of each of the bills transferred, or a width of each of the bills, in a direction orthogonal to a transfer direction, is in excess of a reference value before the discrimination unit starts to determine the bill; and a controller for controlling such that the transfer direction of the first transfer mechanism is changed over to a direction opposite to a normal direction upon the simple discrimination unit determining that the degree of the slant of the bill or the width of the bill is in excess of the reference value.

4. The cash depository according to claim 3, further comprising a draw-out unit for drawing out the bills thrown in the cash inlet to the first transfer mechanism, and sending back the bills transferred on a transfer path of the first transfer mechanism, in a direction opposite to a normal direction to the cash inlet.

5. The cash depository according to claim 4, wherein the controller causes the motor to rotate in the first direction upon the simple discrimination unit determining that the degree of the slant of each of the bills being transferred and the width of each of the bills are not more than the reference values, thereby transmitting the rotational force to the second transfer mechanism via the first rotational force transmission unit that is in a locked state against the rotation in the first direction while the controller causes the motor to rotate in the second direction upon the simple discrimination unit determining that the degree of the slant of the bill or the width of the bill is in excess of the reference values, to change over the transfer direction of the first transfer mechanism to the direction opposite to the normal direction, and to transmit the rotational force to the second transfer mechanism via the second rotational force transmission unit that is in a locked state against the rotation in the second direction, thereby transferring the bill in the normal direction.

6. A cash depository comprising:

a cash inlet where a customer throws bills in;

a first transfer mechanism for internally transferring the bills thrown in the cash inlet;

a second transfer mechanism provided in a back-end stage of the first transfer mechanism;

a discrimination unit, provided in the second transfer mechanism, determining whether the bills are genuine;

a simple discrimination unit, provided in the first transfer mechanism, for determining whether or not a degree of a slant of each of the bills transferred, or a width of each of the bills, in a direction orthogonal to a transfer direction, is in excess of a reference value before the discrimination unit starts to determine the bill;

a motor for driving the first and second transfer mechanisms;

a first rotational force transmission unit having unidirectional rotational force transmission characteristics, for transmitting a rotational force of the motor to the second transfer mechanism;

a second rotational force transmission unit having unidirectional rotational force transmission characteristics, in a direction opposite to that for the first rotational force transmission unit, for transmitting the rotational force of the motor to the second transfer mechanism; and a controller for controlling such that a transfer direction of the first transfer mechanism is changed over to a direction opposite to a normal direction by reverse-rotating the motor upon the simple discrimination unit determining that the degree of the slant of the bill or the width of the bill is in excess of the reference value.

7. The cash depository according to claim 6, further comprising a draw-out unit for drawing out the bills thrown in the cash inlet to the first transfer mechanism, and sending back the bills transferred on a transfer path of the first transfer mechanism, in a direction opposite to a normal direction to the cash inlet.

8. The cash depository according to claim 6, wherein the first rotational force transmission unit has the unidirectional rotational force transmission characteristics such that the first rotational force transmission unit is in a locked state against rotation in a first direction, thereby transmitting the rotational force to the second transfer mechanism, and is in a free state against rotation in a second direction, thereby failing to transmit the rotational force, and wherein the second rotational force transmission unit has the unidirectional rotational force transmission characteristics such that the second rotational force transmission unit is in a free state against the rotation in the first direction, thereby failing to transmit the rotational force to the second transfer mechanism, and is in a locked state against the rotation in the second direction, thereby transmitting the rotational force.

* * * * *

UNITED STATES PATENT AND TRADEMARK OFFICE

CERTIFICATE OF CORRECTION

PATENT NO. : 7,191,937 B2
APPLICATION NO. : 11/046778
DATED : March 20, 2007
INVENTOR(S) : Hayato Minamishin et al.

It is certified that error appears in the above-identified patent and that said Letters Patent is hereby corrected as shown below:

Column 8, Line 41, change “units” to --unit,--.

Signed and Sealed this

Twenty-sixth Day of June, 2007

JON W. DUDAS
*Director of the United States Patent and Trademark Office*